March 23, 1954 H. THOMAS 2,672,855
THROTTLE CONTROL FOR INTERNAL-COMBUSTION ENGINES
Filed June 19, 1951 3 Sheets-Sheet 1

INVENTOR.
Harry Thomas

Patented Mar. 23, 1954

2,672,855

UNITED STATES PATENT OFFICE 2,672,855

THROTTLE CONTROL FOR INTERNAL-COMBUSTION ENGINES

Harry Thomas, Detroit, Mich.

Application June 19, 1951, Serial No. 233,810

10 Claims. (Cl. 123—103)

1

This invention relates to an improvement in throttle controls for internal-combustion engines and is particularly designed to increase engine efficiency, smoothness, power, and life. It is applicable to any engine installation but is especially adaptable to engines installed in vehicles.

In an internal-combustion engine, it is desirable to have the highest compression ratio possible in order to obtain maximum power and economy. The limiting factor is the roughness and tendency to detonate at wide open throttle, full-load operation. This roughness and detonation first becomes noticeable at low engine speeds; and as the compression ratio is increased, a proportionately higher speed range is also affected.

This roughness and detonation may be reduced or eliminated by the use of the more expensive, uneconomical high-octane fuels. Retarding the ignition timing is also beneficial but is also uneconomical since it reduces the operating efficiency of the engine.

However, the more efficient and economical method of obtaining smooth and quiet performance is the one employed by the present invention, which is to limit the flow of motive fluid entering the intake manifold of an internal-combustion engine to an amount which the engine can utilize without detonation or roughness.

One of the objects of the present invention is to provide an improved throttle control which permits the use of low octane fuels, higher compression ratios, and higher engine operating efficiencies than could be permitted with throttle controls used heretofore.

A second object is to provide means which will limit engine output at all speeds to any desirable fraction of maximum wide open throttle power. In this manner, both acceleration and maximum speed of a vehicle may be limited to any desirable extent and the life of the engine and vehicle considerably lengthened. Owners of large fleets of taxis, rental cars, trucks, etc., will find this feature of the invention especially useful in reducing maintenance and fuel costs.

Further and incidental objects and advantages of the present invention will appear in the following description, reference being had to the accompanying drawings.

Referring to the drawings.

Figure 1:
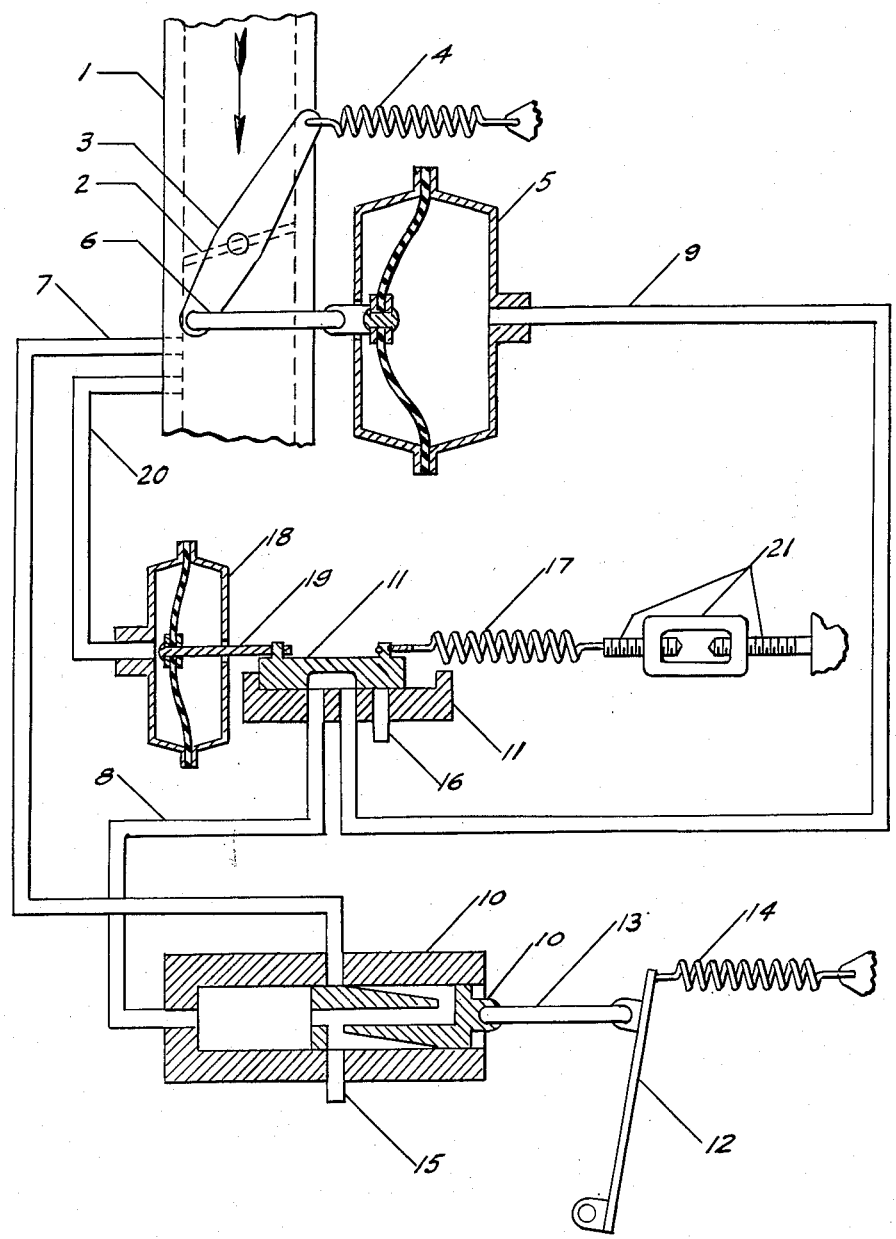
Fig. 1 shows one embodiment of the form of the present invention.

2 valve motivation without the necessity of linkage, but also approximates the operation of the combination shown in Fig. 1 with the added advantage of greater simplicity.

Figure 3:
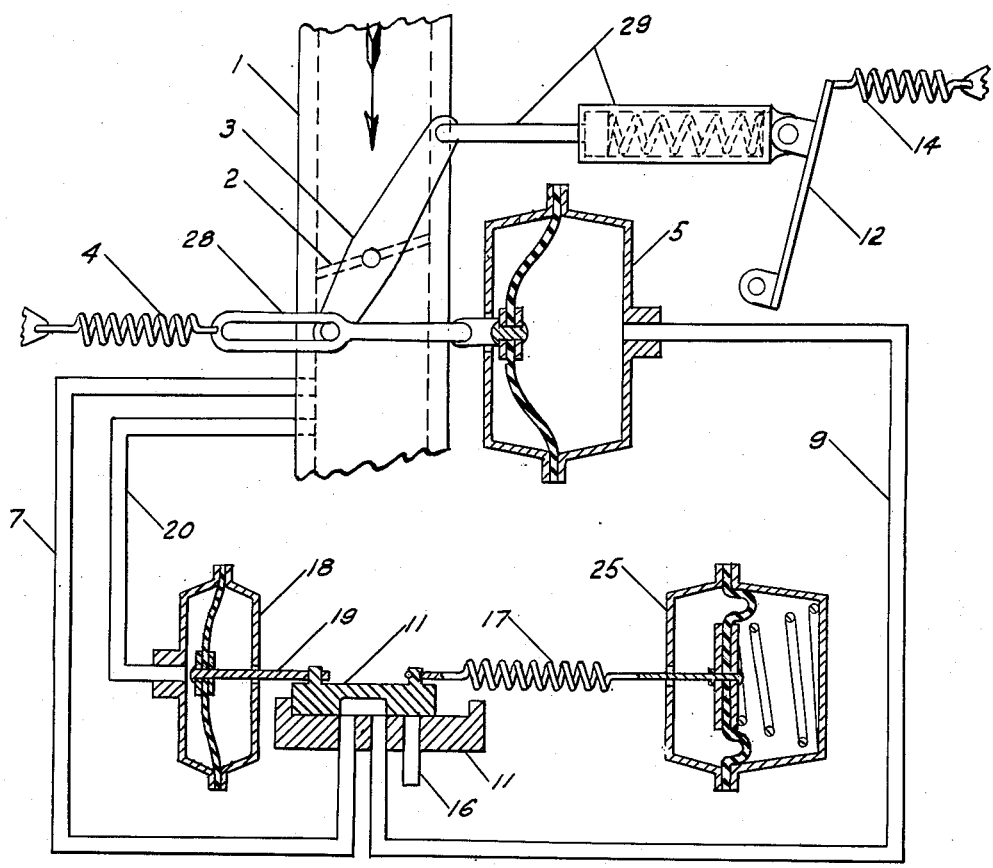

Fig. 3 shows an embodiment of still another form of the present invention.

Referring back again to Fig. 1, an intake manifold or passage, 1 of an internal-combustion engine is shown with a throttle valve 2 operated by the lever 3 with a spring 4 tending to close said throttle valve. The lever 3 is motivated by the throttle servo-motor 5 through a connecting rod 6. The throttle servo-motor 5 is motivated by sub-atmospheric pressures, the degree of motivation being proportional to the differential between the motivating pressure and atmospheric pressure. This motivating pressure is obtained from the intake manifold 1 at a point on the engine side of the throttle valve 2 and conducted to the throttle servo-motor 5 through the conduits 7—8—9. The motivating pressure is regulated by the metering valve 10 and governing valve 11 which are interposed in the conduit supply system 7—8—9.

The metering valve 10 is operated by the manually-controlled accelerator lever 12 through the connecting rod 13. A spring 14 returns the manually-controlled accelerator lever 12 and metering valve 10 to their so-called normal position in the absence of a manual motivating force. The metering valve 10 regulates the air flow through the atmospheric port 15 into the throttle servo-motor supply conduit 8 and air flow through conduit 7 in such a manner that at the normal, or "closed throttle," position of the metering valve, atmospheric pressure is supplied to the throttle servo-motor rendering it inoperative, thus allowing the spring 4 to hold the throttle valve closed. As the metering valve is gradually moved to its fully-motivated position by the accelerator lever 12, the effect of the atmospheric port 15 gradually diminishes and the influence of the manifold pressure source increases and a gradually decreasing pressure is supplied to the throttle servo-motor 5, causing a proportional motivation of said servo-motor and consequently throttle valve 2.

A governing valve 11 is installed between conduits 8—9 to further regulate pressure supplied to the throttle servo-motor 5. It accomplishes this by regulating air flow through a second atmospheric port 16 and also air flow through the conduit 8. A spring 17 holds the governing valve 11 in its so-called normal position in the absence of an opposing motivating force.

A governing servo-motor 18 connected to the governing valve 11 by the connecting rod 19 is motivated by subatmospheric pressure obtained from the intake manifold 1 at a point on the engine side of the throttle valve 2 through the conduit 20. At a predetermined manifold pressure, as determined by the counterbalancing force of the spring 17, governing servo-motor 18 will pull the governing valve to its fully-motivated position. In this position, the governing valve relays pressure in the conduit 8 to the throttle servo-motor 5 without change. However, if the pressure in the intake manifold 1 approaches this predetermined value, the counterbalancing force of the resilient means 17 is sufficient to move the governing valve to such a position that air is allowed to bleed into the supply conduit system, thereby increasing the pressure being delivered to the throttle servo-motor 5 and limiting throttle valve motivation sufficiently to prevent intake manifold pressure from exceeding the predetermined value. The said predetermined value of intake manifold pressure may be varied to any desirable extent by the adjustment means 21 which changes the counterbalancing force of the spring 17.

Figure 2:
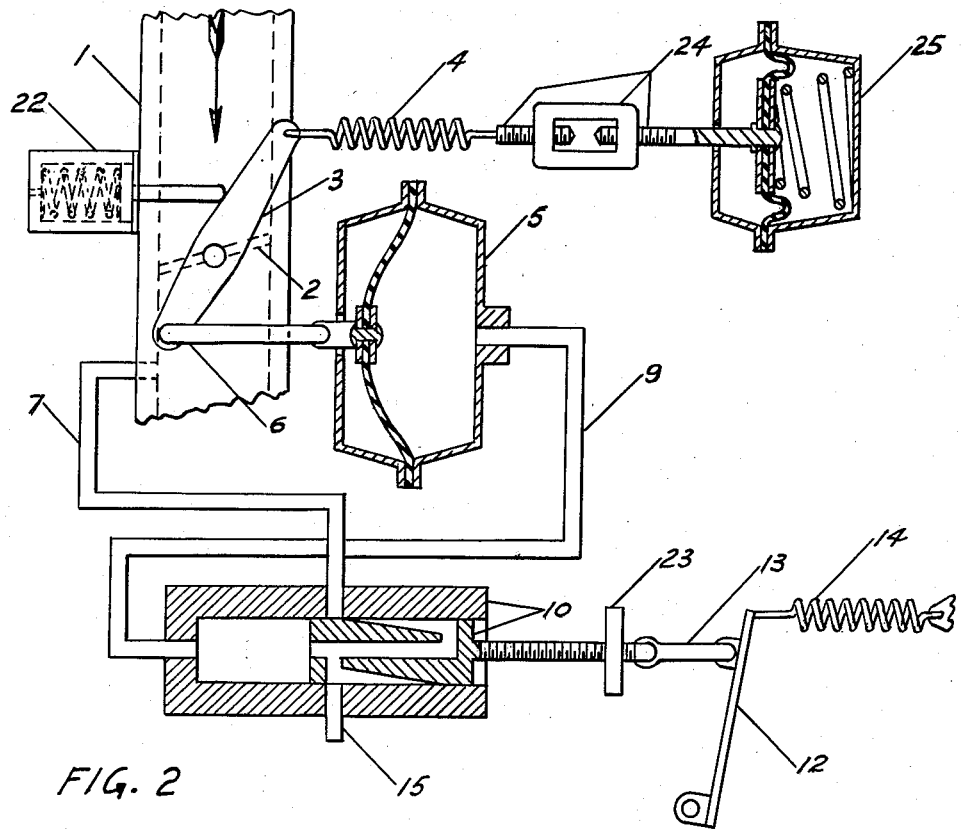
Fig. 2 shows a novel throttle control principle which is employed in some of the forms of the present invention. Its usefulness lies not only in the fact that it furnishes a means of throttle

Fig. 2 is substantially the same as Fig. 1 except for the omission of the governing valve 11 and related parts. The metering valve 10 in this case takes over the function of the governing valve 11. This method does not have the precise control over maximum manifold pressure as does the method shown in Fig. 1. However, it approximates the performance of the latter and its advantage lies in its greater simplicity. In the fully-motivated position of the metering valve 10, the atmospheric port 15 is completely shut off and the intake manifold pressure is relayed on to the throttle servo-motor 5 without change. Since the manifold pressure at the very low engine speeds at wide open throttle is near atmospheric, the throttle servo-motor does not have sufficient power to fully open the throttle valve but opens it only as far as its power, which diminishes inversely with the degree of throttle opening at any given speed, can counterbalance the varying influence of the resilient means 4. As the engine speed increases, the manifold pressure decreases which in turn increases the ability of the throttle servo-motor 5 to open the throttle valve 2. In this manner, maximum output is permitted at the higher speeds; while at the lower engine speeds a slight throttling of the charge entering the intake manifold effectively reduces engine output, thus resulting in smoother performance with higher compression ratios.

The dashpot 22 prevents too rapid opening of the throttle valve, thus allowing sufficient time for the pressure-actuated system to function and prevent excessive manifold pressures.

In order to vary the degree of throttling throughout the speed range, an adjustable stop means 23 is provided on the metering valve 10 which alters the fully-motivated position of the metering valve to permit any desirable amount of air to bleed into the atmospheric port 15. A manually-operated adjustment 24 is also provided to vary the influence of the spring 4 on throttle opening.

In order to permit greater throttle valve openings to compensate for the loss of power caused by lower atmospheric pressures at higher altitudes, an atmospheric pressure responsive device 25 is provided to vary the influence of the spring 4 inversely with altitude.

Fig. 3 shows another method of controlling the throttle valve by using the governing valve 11 in combination with a manually controlled means. In this method, throttle servo-motor 5 serves as a throttle-limiting device in combination with the spring 4 and governing valve 11 and has no power to open the throttle valve. It accomplishes the throttle valve limiting function by controlling the movable stop 28. To open the throttle valve an additional connecting member 29 between the manually-operated accelerator 12 and throttle valve 2 is provided. This connecting member 29 is constructed so as to be yieldable and resilient in the throttle-opening direction if opposed by a superior force from the combination of the throttle servo-motor 5 and spring 4, but to act as a rigid member in the throttle-closing direction. The spring 4 returns the manually-operated accelerator lever 12 and throttle valve 2 to their normal "closed throttle" position in the absence of an opposing motivating force. The metering valve 10 and related parts are omitted in this system.

An atmospheric pressure responsive element 25 is also shown connected to the spring 17 in such a manner that the influence of the spring 17 is weakened proportionately with an increase in altitude, permitting fuller motivation of the throttle valve 2 at higher altitudes.

What I claim is as follows:

1. In an internal combustion engine having an intake manifold and a throttle valve in said manifold controlling the flow of motivating fluid into the engine, a throttle control comprising in combination: a pressure-actuated means connected to said throttle valve and motivated by subatmospheric pressures in a direction permitting throttle valve opening, a resilient means tending to close said throttle valve, a conduit supplying said pressure-actuated means with intake manifold pressure obtained from said manifold at a point on the engine side of said throttle valve, and an air bleed leading into said conduit.

2. The throttle control as set forth in claim 1 including a valve controlling the flow of air through said air bleed, a valve control means, and a manually-operated means working in conjunction with said pressure-actuated and resilient means to control the position of said throttle valve.

3. The throttle control as set forth in claim 1 including a valve controlling the flow of air through said air bleed, a manually-operated means controlling the position of said main valve, and a resilient means tending to open said main valve.

4. The throttle control as set forth in claim 3 including a dashpot capable of slowing down the opening of said throttle valve while having little or no effect on the closing of said throttle valve.

5. The throttle control as set forth in claim 3 including a second valve interposed in said main conduit on the intake manifold side of said main air bleed and operated concurrently with said first valve but in a reverse manner, i. e., as said first valve closes, said second valve opens.

6. The throttle control as set forth in claim 3 including an atmospheric pressure responsive adjustment means varying the influence of said resilient means on said throttle valve so as to permit greater throttle openings as the atmospheric pressure decreases.

7. The throttle control as set forth in claim 3 including a manually-adjustable stop means to limit the extent of main air bleed valve closing.

8. The throttle control as set forth in claim 1 including a valve controlling the flow of air through said air bleed, a second pressure-actuated means controlling the position of said valve whereby said valve is moved toward the closed position as the motivating pressure decreases, a resilient means tending to open said valve, a conduit supplying said second pressure-actuated means with sub-atmospheric pressures obtained from said intake manifold at a point on the engine side of said throttle valve.

9. The throttle control as set forth in claim 3 including a second air bleed leading into said main conduit, a second valve controlling the flow of air through said second air bleed, a second pressure-actuated means controlling the position of said second valve whereby said second valve is moved toward the closed position as the motivating pressure decreases, a resilient means tending to open said valve, and a second conduit supplying said second pressure-actuated means with sub-atmospheric pressure obtained from said intake manifold at a point on the engine side of said throttle valve.

10. In an internal combustion engine having an intake manifold and a throttle valve in said manifold controlling the flow of motivating fluid into the engine, a throttle control comprising in combination: a manually-operated means controlling the position of said throttle valve in conjunction with other means, a resilient means tending to return said manually-operated means to the closed throttle position, a power transmitting connecting means between the manually-operated means and said throttle valve, one member thereof being constructed to act as a rigid member when moving in the throttle closing direction but yieldable and resilient to a superior opposing force when moving in the throttle opening direction, a movable stop means limiting the degree of throttle valve opening, a main pressure-actuated means working in a throttle opening direction when supplied with sub-atmospheric pressures to vary the position of said stop means, a resilient means tending to move said stop means to the closed throttle position, a main conduit supplying said main pressure-actuated means with sub-atmospheric pressures from said intake manifold at a point on the engine side of said throttle valve, an air bleed leading into said conduit, a valve controlling the flow of air through said air bleed, a second pressure-actuated means controlling the position of said valve whereby said valve is moved toward the closed position as the motivating pressure decreases, a resilient means tending to open said valve, and a second conduit supplying said second pressure-actuated means with subatmospheric pressures obtained from said intake manifold at a point on the engine side of said throttle valve.

HARRY THOMAS.

References Cited in the file of this patent

UNITED STATES PATENTS

| Number | Name | Date |
|--------|------|------|
| 2,415,505 | Mallory | Feb. 11, 1947 |
| 2,529,437 | Weinberger | Nov. 7, 1950 |